May 2, 1967 V. J. HIMROD ETAL 3,317,101
WEB ALIGNING APPARATUS FOR SLAVE AND MASTER WEBS
Filed Aug. 11, 1964 2 Sheets-Sheet 1

INVENTORS
VINCENT JEROME HIMROD
DANIEL EDWARD MCDERMOTT

BY Robert W Black

ATTORNEY

United States Patent Office 3,317,101
Patented May 2, 1967

3,317,101
WEB ALIGNING APPARATUS FOR SLAVE AND MASTER WEBS
Vincent Jerome Himrod and Daniel Edward McDermott, Richmond, Va., assignors to E. I. du Pont de Nemours and Company, Wilmington, Del., a corporation of Delaware
Filed Aug. 11, 1964, Ser. No. 388,754
4 Claims. (Cl. 226—19)

This invention relates to alignment of continuous webs. More particularly, this invention relates to new and useful automatic web guiding methods and apparatus for maintaining two or more continuously moving webs in substantially fixed lateral relationship with respect to one another.

There are many types of operations where it is useful or desirable to align two or more continuously moving webs. In some cases the webs are being permanently combined, as in manufacture of composite or laminated articles of many types, while in other cases the webs are combined for convenience in processing or treating operations and are subsequently separated, as in the multi-sheet casting of regenerated cellulose films.

In some cases the webs to be aligned are of constant width and equal in width; in these cases, in order to maintain the webs in registration, it is necessary only to detect the positions of one edge of each web and to maintain these edges in registration. In other cases the webs to be aligned are of constant width but unequal in width; in such cases, although it is possible to maintain one set of edges in registration, it is more common practice, and usually more desirable, to center one web on the other; the latter can be done by detecting one edge of each web, and guiding these edges to separate positions which correspond to registration of the center lines of the two webs. In still other cases, one or more of the webs may constantly vary in width; in such cases it is a frequent practice, though not necessary, to detect both edges of the sheet, and to maintain this sheet in registration with the others by guiding its center line to the desired reference position. The present invention, described hereinbelow, may be used in any of the situations here enumerated. For brevity and convenience the novel method and apparatus will be described with reference to only one of these situations, that in which the webs are of constant width and equal in width. It is to be understood that the invention is equally useful in the other situations listed.

One method of the prior art that has been employed in registration of webs is to guide each web independently to a fixed line in the machine. For this purpose two separate web edge lateral position detectors and web guiding units are used independently. Although acceptable in some situations, this method requires virtually constant adjustment of the positions of both webs. Not only has maintenance of web registration in such a system proven to be rather poor, but this degree of adjustment is both unnecessary and of no value in those situations where only the relative positions of the two webs is of importance.

In another method of the prior art, two web edge lateral position detectors are mounted on a common support which is movable in a direction transverse to the paths of two webs whose corresponding edges are to be maintained in registration. The two detectors are positioned on the movable support for sensing, respectively, the positions of the corresponding edges of the two webs, and each produces an operating signal on departure from a preselected positional relationship between itself and the web edge with which it cooperates. A first servomechanism is operatively connected to the movable detector support, and is controlled by the signal output of a first one of the detectors which is cooperative with an edge of the first or master web to move the support, and thus both of the detectors supported thereon, to restore the preselected positional relationship between the first detector and the edge of the master web upon generation by the first detector of a signal output indicating a variance from that relation. Thus, the first detector and servomechanism operate to make the support and both detectors follow lateral shifts of the master web. A second servomechanism is arranged to laterally shift the second web in response to a signal generated by the second detector that is indicative of a variance from the preselected positional relationship between the second detector and an edge of the second or slave web. Thus, the second detector and servomechanism cause the slave web to follow the support and the second detector when the latter move in response to a signal from the first detector. In this system, the sequence of operations is such that the support and both detectors follow lateral shifts of the master web, and the slave web is shifted to follow the second detector to register its edge with the master web edge. The master web is not guided to a reference line but is permitted to weave or shift from side to side. A prime disadvantage of this system is the lag time inherent in initiating the slave web shifting operation after an operation-initiating lateral movement of the master web which occurs due to the time lapse during which (1) response of the first servomechanism, (2) movement of the movable support, (3) commencement of generation of a signal by the second detector, and (4) initiation of response to that signal by the second servomechanism, occur.

An object of the present invention is to provide an improved method and apparatus for maintaining two or more moving webs in substantially fixed lateral relationship to one another wherein one web, which serves as a master web, may weave from side to side, and the second web, which is the slave web, is maintained in alignment with the master web, whereby the lag time in repositioning the slave web is minimized.

A further object of the invention is to provide an improved method for maintaining alignment when repositioning of the slave web is effected by a cambering roll, the method being of particular use in minimizing the amount of cambering which need be done.

A still further object of the invention is to provide an improved method and apparatus for maintaining alignment of moving webs where one or more of the webs is weak or limp, and/or is easily stretched or folded over on itself, which method and apparatus minimize any permanent damage done to the web resulting from the repositioning operation. These and other objects of the invention will appear hereinafter.

These and other important objects and advantages of the invention will become apparent as the same is more fully understood from the following description, which, taken in connection with the accompanying drawings, discloses preferred embodiments of the invention wherein.

Figure 1:
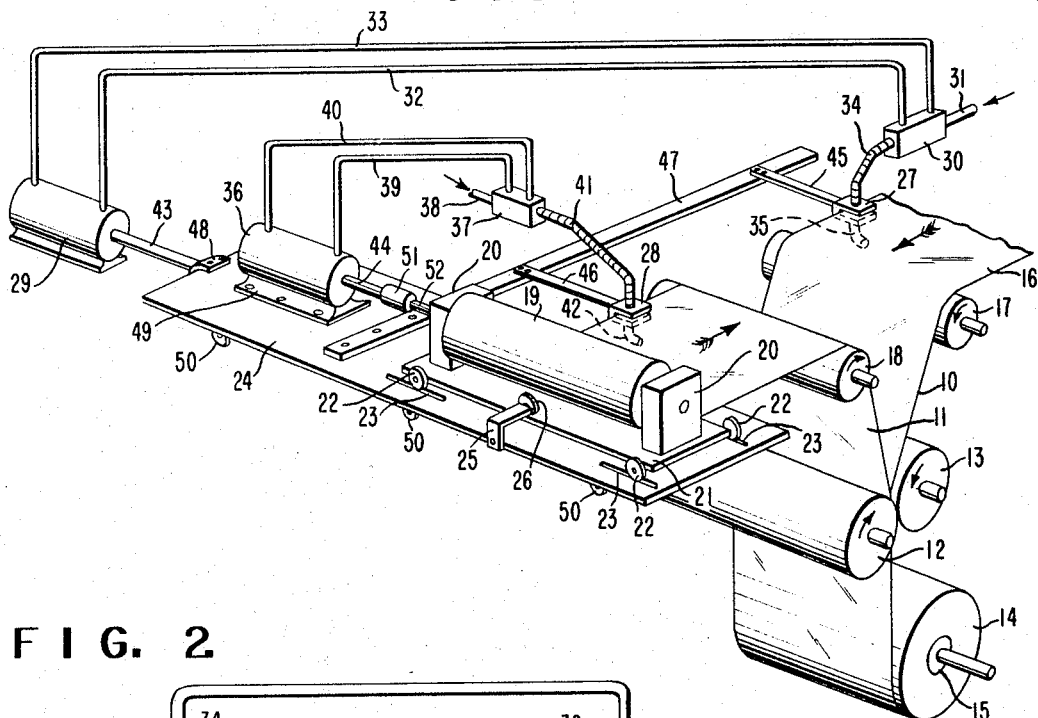
FIGURE 1 is a partly diagrammatic and partly schematic view of a laminating apparatus showing one complete embodiment of the invention.

In FIGURE 1 of the drawings, a primary or master web 10 and a secondary or slave web 11 are brought together under pressure and heat to laminate them between a roll 12 surfaced with a resilient material such as rubber and a heated metal roll 13. The laminated product is wound into roll 14 on a suitably driven mandrel 15. The master web 10 carries an adhesive on its face 16, and is guided into the nip between combining rolls 12 and 13 around guide roll 17. Similarly, slave web 11 is guided into the nip around guide roll 18.

The master web 10 is usually fed onto guide roll 17 from coating apparatus where the adhesive is applied. The slave web 11 is supplied from a roll 19 on which it is wound. In this specific embodiment, the roll 19 is supported in such a way as to be readily and freely shifted from side to side in order that the slave web 11 may be maintained in accurate alignment with the master web 10. The roll 19 is supported between end support bearings 20 which are mounted on platform 21 of a carriage provided with support wheels 22 at each corner. The wheels 22 ride in grooved tracks 23 in the bed support 24. A bracket 25 secured to bed support 24 carries a wheel 26 which overhangs and rides on the top surface of platform 21, thus insuring that the carriage cannot tilt or otherwise disengage from the grooved tracks 23. It will be understood that numerous other arrangements are possible whereby the web roll 19 may be movably supported so that it may be laterally shifted during the course of the laminating operation.

The master web 10 serves as a reference or control web, and the slave web 11 is maintained in accurate alignment with the master web 10. The automatically operated apparatus includes a pair of detectors 27 and 28 which are sensitive to the location of the corresponding edges of the running webs 10 and 11, respectively.

A first servomotor 29 is controlled and operated by means of a first control unit 30, which unit responds to signals received from the first detector 27, which is sensitive to the location of an edge of master web 10. The control unit 30 is connected with a source of fluid pressure delivered through the pipe 31 and operates to supply fluid under pressure to the servomotor 29 at opposite ends of the cylinder through the pressure lines 32 and 33. The control unit 30 is in turn actuated by variations in air pressure received from the flexible conduit 34 leading from the detector 27. Air under regulated pressure is introduced into the detector 27 through a flexible conduit 35.

A second servomotor 36 is controlled and operated by means of a second control unit 37, which unit responds to signals received from the second detector 28, which is sensitive to the location of an edge of slave web 11. The control unit 37 is connected with a source of fluid pressure delivered through the pipe 38 and operates to supply fluid under pressure to the servomotor 36 at opposite ends of the cylinder through the pressure lines 39 and 40. The control unit 37 is in turn actuated by variations in air pressure received from the flexible conduit 41 leading from the detector 28. Air under regulated pressure is introduced into the detector 28 through a flexible conduit 42.

In this embodiment, the servomotors 29 and 36 take the form of double-acting cylinders wherein the pistons and the connecting rods 43 and 44, respectively, constitute the output elements.

First detector 27 is held in its operating position by support member 45, and second detector 28 is held in its operating position by support member 46. Support members 45 and 46 are secured to cross beam 47 which is in turn secured to the bed support 24. The connecting rod 43 of first servomotor 29 is secured to bed support 24 by clamp member 48. Support member 49 which carries second servomotor 36 is securely mounted on the bed support 24. According to the present invention as here described, detectors 27 and 28, second servomotor 36, and bed support 24 (which carries the slave web positioning means, in this embodiment the movable carriage comprising platform 21 and support bearings 20) are secured in fixed space relationship to one another, and are shifted transversely in unison as a single unit by first servomotor 29. Bed support 24 in turn rests on support means, in this case wheels 50, which allow it to be moved transversely with respect to the direction of web travel. It is clear that other arrangements are possible for movably supporting bed support 24 to allow it to be laterally shifted by servomotor 29.

The connecting rod 44 of second servomotor 36 is coupled to the carriage for the web roll 19 by means of a coupling 51 joining the outer end of the connecting rod 44 and the outer end of a rod 52 which projects from the carriage assembly.

When a zero line through the detector 27 is in registration with the edge of the web 10 the amount of pressure delivered to the control unit 30 through the connection 34 will be of such a magnitude that the control unit 30 will serve to maintain equal pressures on opposite sides of the double-acting piston within the first servomotor 29 and there will be no movement of the piston and the connecting rod 43. However, if the zero line of the detector 27 is not in registration with the edge of the web 10, then a greater or lesser pressure will be delivered to the control unit 30 depending upon which side of the zero line the web edge lies. The result will be that the control unit 30 will apply an excess of pressure to one side or the other of the piston of the first servomotor 29 thereby causing the piston to move in one direction or the other carrying with it the connecting rod 43, the bed support 24 having affixed to it second servomotor 36, and the edge sensitive detectors 27 and 28 supported from the cross beam 47. As will appear from the following description in connection with FIGURES 2 and 3, the piston within the first servomotor 29 will continue to move in the proper direction until the detector 27 is back in zeroed position with respect to the edge of the running web 10.

Fluid pressure for operating the second servomotor 36 is introduced into the control unit 37 through the inlet connection 38 and is delivered to the opposite ends of the cylinder of the second servomotor 36 through the pressure lines 39 and 40. If the detector 28 is zeroed with the edge of the web 11, then the control unit 37 delivers equal pressure to the opposite sides of the double-acting piston of the second servomotor 36 and the piston remains stationary so that no movement is imparted to the carriage supporting the web roll 19. If the zero relationship between the detector 28 and the edge of the web 11 is disturbed through shifting of the edge of the web, then an excess of pressure will be applied to the proper side of the double-acting piston so that it moves in the proper direction to shift the carriage so as to bring the edge of the web 11 back into zero relationship with the edge sensitive detector 28.

Since the position of the bed support 24, and thus also the second servomotor 36, the carriage supporting the web roll 19, and detectors 27 and 28, is adjusted by the first servomotor 29 which is controlled by control unit 30 in response to a signal from first detector 27, the registration of the slave web 11 to the master web 10 after a shift of master web 10 is automatically maintained without disturbing the zero relation between second detector 28 and the edge of the slave web 11, and thus without disturbing the control unit 37 and second servomotor 36. Second detector 28, control unit 37 and servomotor 36 cooperate to reposition slave web 11 into alignment should it shift out of alignment, or to adjust for unevenness in winding on the roll 19.

The construction and operation of the servomotor 29 and 36 and their control units 30 and 37 will now be set forth in greater detail in connection with FIGURES 2 and 3. The servomotor control apparatus consisting of the servomotors 29 and 36, the control units 30 and 37, and the edge sensitive detectors 27 and 28 may be adaptions of a commercial type such as those which may be obtained from the Askania Regulator Company, Chicago, Illinois. The air inlet connections 35 and 42 may be provided with check valves 53 and 54 respectively so that the air pressure may be turned off when the regulators are not in use. The air connections 35 and 42 may be connected with the plant air pressure system or separate air compressor units may be utilized. Each of the edge sensitive detectors 27 and 28 has a slot opening 55 or 56, respectively, in which the respective edges of the webs 10 and 11 run. Preferably the detectors 27 and 28 are positioned so that the edges of the webs run close to the air pressure intake ports 57 and 58 respectively. The flexible air pressure connections 34 and 41 communicate between the intake ports 57 and 58, respectively, and bellows units 59 and 60, respectively, which form elements of the control units 30 and 37. The control unit 30 has an oil jet pipe 61 which is pivotally connected at 62 to the oil pressure inlet line 31. The jet pipe 61 is connected on one side to the bellows unit 59 while on the opposite side it is connected to a fixed part of the apparatus 30 by means of a connection which includes a compression spring 63 which may be adjusted by turning the thumb wheel 64. A centrifugal pump 65 driven by an electric motor 66 serves to supply oil under pressure to the jet pipe 61. The oil discharged from the outlet end of the jet pipe 61 is directed into an oil pressure distributor block 67 having branched conduit paths 68 and 69 communicating with a common inlet port 70. The oil pressure line 32 to the servomotor 29 is connected with the right-hand conduit or passageway 69 while the pressure line 33 is connected with the left-hand passageway 68 as shown in FIGURE 2.

When initially starting up the apparatus the tension on the spring 63 is so regulated that the oil jet pipe 61 will distribute the oil under equal pressures to both of the passageways 68 and 69 when the adjacent edge of the web 10 coincides with a diameter line through the intake port 57. When this relationship exists the detector 27 is zeroed with the web 10. Under these conditions the pressures delivered to opposite sides of the double-acting piston within the servomotor 29 will be equal and the piston will be held motionless. If the web 10 should now shift to the right as viewed in FIGURE 2, a greater portion of the area of the intake port 57 would be uncovered and a greater amount of air pressure introduced from the line 35 will be picked up and delivered through the flexible conduit 34 to the bellows unit 59. The bellows unit 59 is thereby expanded so as to allow the oil jet pipe 61 to be turned counterclockwise thereby delivering an excess of oil pressure into the passageway 68 while the oil pressure delivered into the passageway 69 is decreased. The excess in pressure will build up on the rear (left) side of the piston of the servomotor 29 thereby forcing the piston to the right and forcing the connecting rod 43 also to the right. As described above in connection with FIGURE 1, the edge sensitive detector 27 is operatively connected to the connecting rod 43 and this will shift the detector 27 to the right as viewed in FIGURE 2 thereby covering up a greater portion of the intake port area 57. The excess pressure continues to exist and move the connecting rod 43 until the detector 27 has been so shifted that it is once again zeroed with respect to the edge of the moving web 10 whereupon the pressures to the servomotor 29 will again be equalized and the connecting rod 43 and the detector 27 will be stationary. Conversely, should the web 10 shift to the left as viewed in FIGURE 2 so as to cover up more than half of the intake area of the port 57, the pressure delivered to the bellows unit 59 would be decreased and the oil jet pipe would be moved clockwise to a position where an excess of oil pressure would be delivered to the passageway 69 and the oil pressure delivered to the passageway 68 would be decreased. Accordingly, an excess of pressure will be applied to the front (right) side of the double-acting piston and the piston will be moved so as to retract the connecting rod 43 and shift the edge sensitive detector 27 away from the edge of the web until it is again zeroed and the pressures are equalized.

The control unit 37 which operates the servomotor 36 corresponds in construction to the control unit 30. In addition to its bellows element 60, it has an oil jet pipe 71 pivotally mounted at 72 and connected with the oil inlet connection 72 which is supplied with oil under pressure by means of a pump 73 driven by an electric motor 74. The oil jet pipe 71 is connected on one side to the bellows element 60 and on the other side is connected by an adjustable tension spring 75 to a rigid connection. The tension on the spring 75 may be adjusted by turning a thumb knob 76. The oil distributor block 77 has two passageways 78 and 79 connecting with a common inlet port 80 into which the oil under pressure is delivered from the oil jet pipe 71. In this case, the oil pressure line 39 to the servomotor 36 is connected to the right-hand passageway 79 while the oil pressure line 40 is connected to the left-hand passageway 78 of the oil distributor block 77.

Figure 2:
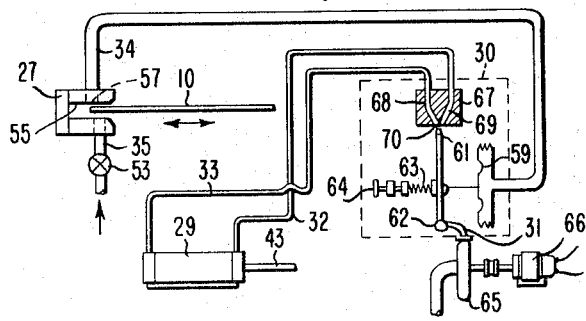
FIGURE 2 and FIGURE 3 are diagrammatic views of the two servomechanisms forming part of the apparatus shown in FIGURE 1.
Figure 3:
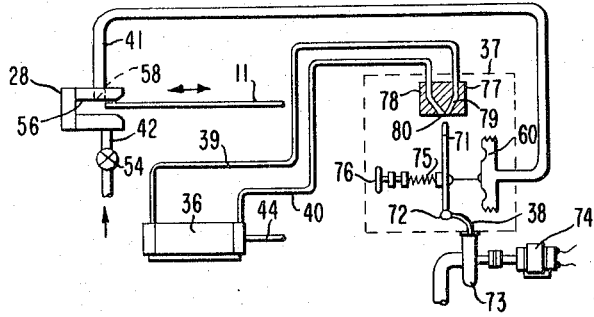

The servomotor control apparatus in FIGURE 3 operates in a like manner to that of FIGURE 2 to take care of shifts in the web 11 such as those due to unevenness in winding on the roll 19. In this case, however, if the web 11 shifts to the right as viewed in FIGURE 3, the greater amount of air pressure introduced from line 42 through intake port 58 into flexible conduit 41 will expand bellows 60 and deflect oil jet pipe 71 to the left. The excess oil pressure delivered into passageway 78 is delivered through pressure line 40 to the front (right) side of the piston of servomotor 36, thereby forcing the piston and the connecting rod 44 to the left. As described in connection with FIGURE 1, the connecting rod is operatively connected with rod 52 of the carriage assembly for web roll 19, and the adjustment of connecting rod 44 to the left moves the carriage and web roll 19 to the left, repositioning slave web 11 into registration with master web 10.

It will be seen that the lag time for repositioning the two webs into registration inherent in the prior art method is substantially reduced by the present invention. Repositioning of the slave web after an operation-initiating lateral movement of the master web is accomplished by (1) response of the first servomechanism and (2) movement of the movable support which carries the two-edge position detectors, the second servomotor, and the web positioning means for the slave web. In this way, no signal from the slave web edge detector has been generated, and no response from the second servomechanism has been required. Realignment has been accomplished quickly and efficiently with no extraneous and unnecessary adjustments.

In certain situations, the present invention is particularly valuable. Such a situation is that where the web positioning means is a cambering roll. As a specific example, the alignment of two or more webs of regenerated cellulose film in a multi-sheet casting operation may be cited.

The commercial method of continuously manufacturing regenerated cellulose film from an aqueous solution of sodium cellulose xanthate (viscose) is disclosed in U.S. Patents 1,548,864 and 1,601,289 to Brandenburger. In this process, viscose is forced through an elongated orifice in the form of a sheet into a coagulating bath to form a coherent web. The film may be cast by any of several known methods including those of Mitchell, U.S. Patent 3,073,733, Hinkle et al., U.S. Patent 2,962,766, Levinson et al., U.S. Patent 3,050,755, and Bender, U.S. Patent 2,254,203. The freshly coagulated film is promptly regenerated, desulfured, bleached, washed, softened, and dried. The dried film is wound into rolls for convenience in handling, storing, and further processing such as coating and slitting into narrow rolls. Up through the softening stage the web of regenerated cellulose remains in a gel condition (i.e., completely saturated with aqueous solution). Since gel regenerated cellulose film contains an amount of water about 3.0 to 3.5 times the weight of dry cellulose, a substantial amount of moisture is removed in the drying operation. It is customary to dry the web by passing it through a chamber in contact with a series of heated rolls such as described by Herndon, U.S. Patent 2,000,079, Chylinski, U.S. Patent 2,141,277, Stevens, U.S. Patent 2,746,166 or Briton et al., U.S. Patent 2,746,167.

It is possible to simultaneously cast and purify two or more sheets of regenerated cellulose film in the same casting machine, as described, for example, by Rosser et al. in U.S. Patent 2,770,015. In such a multi-sheet casting operation it is important that the sheets be aligned in registration near the end of the liquid treatments, shortly before entering the dryer. Otherwise, misalignment of the sheets in the dryer will result in uneven drying of the webs, which causes various types of gauge related quality problems, and in marking of the films where the bead of one film is pressed into the surface of the opposed film, leaving a line impressed there during drying.

It is also possible to prepare on a multi-sheet regenerated cellulose film casting machine a laminated sheet. This is done by passing the several sheets while still in the gel state through a solution of an effective anchoring agent, or alternatively by introducing an adhesive between the sheets, then aligning the sheets in registration and drying. Suitable adhesive materials include, for example, a polyalkylenimine having from two to eight carbon atoms, such as polyethyleneimine or polypropylenimine, or a thermo-setting resin such as urea-formaldehyde, melamine/formaldehyde, guanidine/urea/formaldehyde, or other similar types of anchoring resins well known in the art.

Figure 4:
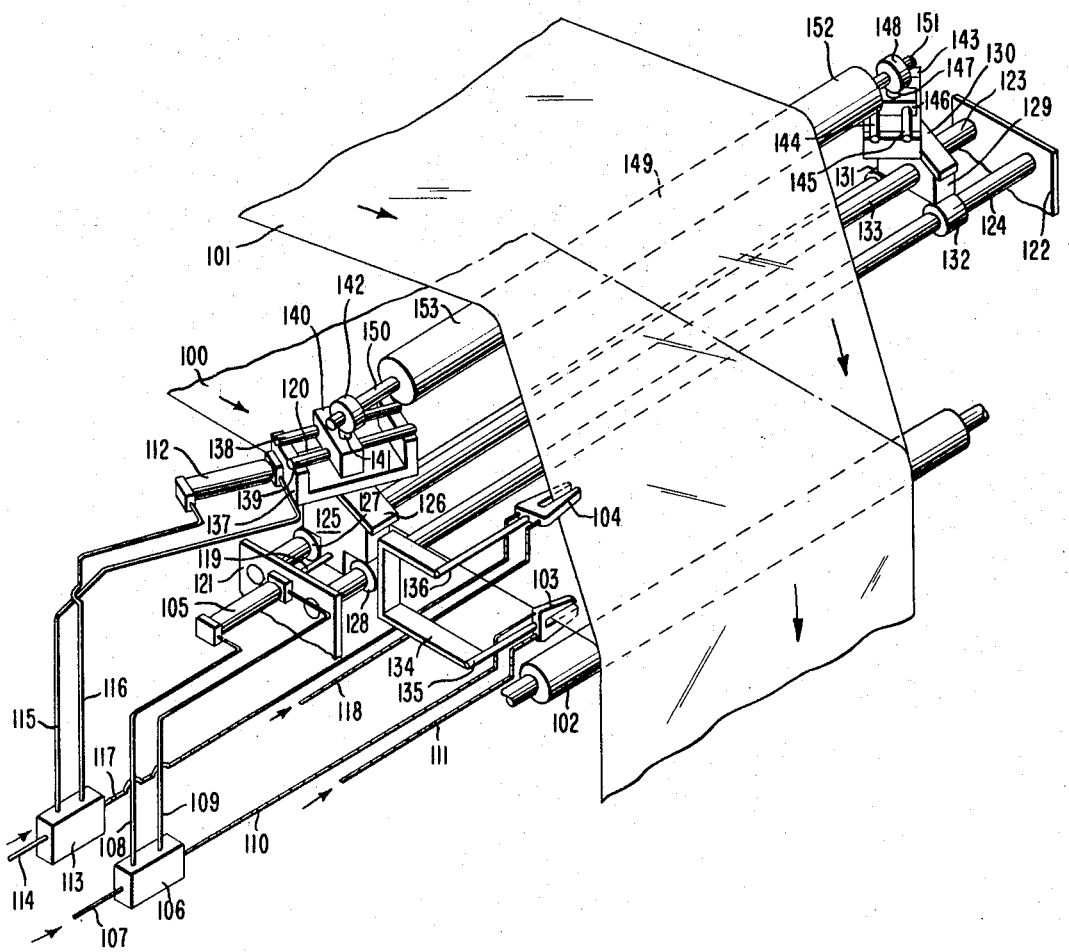
FIGURE 4 is a partly diagrammatic and partly schematic view of a two sheet processing apparatus showing a preferred embodiment of the invention.

Referring now to FIGURE 4, two webs 100 and 101 traveling in the directions indicated by arrows, are brought together at a mating point while passing roll 102, before reaching a next processing operation. Two edge sensing detectors 103 and 104 detect and follow corresponding edges of the two running webs. Detector 103 senses the location of master web 100, which serves as a reference or control web. Detector 104 senses the location of slave web 101, which is repositioned as necessary to maintain it in alignment with master web 100.

A first servomotor is controlled and operated by means of a first control unit 106, which unit responds to signals received from the first detector 103, which is sensitive to the location of an edge of master web 100. The control unit 106 is connected with a source of fluid pressure delivered through the pipe 107 and operates to supply fluid under pressure to the servomotor 105 at opposite ends of the cylinder through the flexible hydraulic pressure lines 108 and 109. The control unit 106 is in turn actuated by variations in air pressure received from the flexible pneumatic line 110 leading from the detector 103. Air under regulated pressure is introduced into the detector 103 through the flexible pneumatic line 111.

A second servomotor 112 is controlled and operated by means of a second control unit 113, which unit responds to signals received from the second detector 104, which is sensitive to the location of an edge of slave web 101. The control unit 113 is connected with a source of fluid pressure delivered through the pipe 114 and operates to supply fluid under pressure to the servomotor 112 at opposite ends of the cylinder through the flexible hydraulic pressure lines 115 and 116. The control unit 113 is in turn actuated by variations in air pressure received from the flexible pneumatic line 117 leading from the detector 104. Air under regulated pressure is introduced into the detector 104 through the flexible pneumatic line 118.

In the embodiment shown, servomotors 105 and 112 take the form of double-acting hydraulic cylinders wherein the pistons and the connecting rods 119 and 120, respectively, constitute the output elements.

Extending between stationary support 121 and stationary support 122 are two traverse rods 123 and 124. First servomotor 105 is affixed to stationary support 121 which contains a hole (not shown) through which connecting rod 119 extends. Connecting rod 119 is in turn affixed to a first carriage assembly consisting of carriage body 125, raceway support 126, and two sleeves 127 and 128. A second carriage assembly consisting of carriage body 129, raceway support 130, and two sleeves 131 and 132 is connected to the first carriage assembly by means of connecting rod 133. On the traverse rods 123 and 124, sleeves 127, 128, 131 and 132 slidably support the two carriage assemblies, which are fixed in spaced relationship with respect to one another by connecting rod 133. Affixed to sleeve 128 is bracket 134, to which is secured support member 135 which carries first detector 103, and support member 136 which carries second detector 104.

Raceway support 126 serves as a mount for a first raceway assembly which consists of support block 137, two guide rods 138 and 139, shoe 140, vertical sindle 141, and bushing 142. Similarly, raceway support 130 serves as a mount for a second raceway assembly which consists of support block 143, two guide rods 144 and 145, shoe 146, vertical sindle 147, and bushing 148. Cambering roll 149 rotates on shafts 150 and 151 which rotatably ride in bushings 142 and 148, respectively.

Second servomotor 112 is affixed to support block 137 which contains a hole (not shown) through which connecting rod 120 extends. Connecting rod 120 is in turn affixed to shoe 140.

According to the present invention as here described, edge sensing detectors 103 and 104, second servomotor 112, and the support means (which in this embodiment comprises the two carriage assemblies connected by rod 133, the two raceway assemblies, bracket 134 and support members 135 and 136) for the web positioning means (which in this embodiment is cambering roll 149) are secured in fixed spaced relationship to one another, and are shifted transversely in unison as a single unit by first servomotor 105.

Slave web detector 104 is preferably placed close to the output side of cambering roll 149 so that control time lag is reduced to a minimum. It is desirable to locate detectors 103 and 104 relatively close to one another to minimize the problem of supporting the detectors rigidly in fixed spaced relationship with one another.

The manner in which first detector 103, first control unit 106, and first servomotor 105 cooperate to follow the edge of master web 100 when it shifts from side to side, and to reposition first detector 103 and the other elements to which first detector 103 is affixed, is similar to that in which the like elements of the apparatus of FIGURE 1 coact. In the interest of brevity this description is not repeated. Further, the manner in which second detector 104, second control unit 113 and second servomotor 112 cooperate to follow the edge of slave web 101 when it shifts from side to side, and to adjust the position of the cambering roll 149, is similar to that in which the corresponding elements of the apparatus of FIGURE 1 coact. Again, description of this coaction would only be repetitious.

The slave web 101 is supported by cambering roll 149 and is maintained in registration with the master web 100 by adjustments in the position of the cambering roll 149. As shown in FIGURE 4, raceway supports 126 and 130 tilt downward in the direction of travel of master web 100; the position and amount of tilt of supports 126 and 130 is such that, when the roll 149 is in the "neutral" position (i.e., parallel to roll 102), a plane drawn through the axis of roll 149 perpendicular to the upper surfaces of raceway supports 126 and 130 approximately bisects the angle formed by the web 101 as it passes over the roll 149. Support blocks 137 and 143 are fixedly mounted on raceway supports 126 and 130, respectively, such that the angle included by the imaginary extension of guide rod 138 and a center line in the machine direction of the processing apparatus is equal to the angle included by the imaginary extension of guide rod 144 and a center line in the machine direction of the processing apparatus. With the roll 149 so mounted, there is a tilting or cambering of the roll as it is shifted transversely on the raceway assemblies by second servomotor 112. By way of example, if the slave web 101 should shift away from detector 104 (i.e., to the upper right as viewed in FIGURE 4) the increased pneumatic signal delivered to control unit 113 will cause an excess in the hydraulic pressure delivered by line 115 to the inside end (i.e., the upper right end as viewed in FIGURE 4 of servomotor 112. The piston contained within servomotor 112, and thus the connecting rod 120 are thereby withdrawn (i.e., move to the lower left as viewed in FIGURE 4), and as roll 149 shifts (to the lower left as viewed in FIGURE 4), end 152 of roll 149 moves slightly forward into the path of the web 101, thus biting more deeply into the corresponding side of the web, while end 153 of roll 149 moves slightly rearward, thus exerting less pressure on that side of the web. This cambered movement of the roll improves the capability of roll 149 to guide the web 101 back into registration with master web 100.

When first servomotor 105 operates to adjust the position of the two carriage assemblies joined by rod 133, and thus the two raceway assemblies mounted thereon, it will be apparent that the position of the shoes 140 and 146 within the respective raceway assemblies remain unchanged, and accordingly, the amount of tilt or camber of roll 149 remains unchanged. Registration of the slave web 101 to the master web 100 is thus maintained with a minimum amount of cambering of roll 149.

The surface of the cambering roll 149 may be fabricated of various materials. The nature of the preferred roll surface will vary with the type of web being processed. In the specific case of wet gel regenerated cellulose films, there is a tendency for such films to readily slide over the surface of many types of rolls, thus nullifying or cancelling any attempt to reposition the film; particularly useful materials for surfacing the cambering roll, because of their effectiveness in resisting the tendency of wet gel regenerated cellulose film to slide laterally, are the phenolic resins, such as phenol-formaldehyde resin, and fabrics and papers impregnated with such resins.

In order for the cambering roll to be used effectively without introducing wrinkles and folds into the moving web, the free span through which the web travels just before contacting the cambering roll should be greater than the width of the web, and is preferably at least two to three times the width of the web.

It is not a necessary part of the invention that the edge sensing detector be a pneumatic detector, or that the control unit and servomotor be hydraulic apparatus of the type described in the specific embodiments given hereinabove. Other types of detector and servomechanism may also be used. For example, the guiding apparatus may be based on electrical and optical components. The detector may be an optical detector based on photoelectric principles, with a source of infrared, ultraviolet, visible, or other electro-magnetic radiation coupled with a receptor cell sensitive to the appropriate type of radiation. The servomotor may be a reversible electric motor controlled by an electrical control unit. The invention lies not in the specific nature of the coacting components, but rather in the manner in which they are combined to coact.

Various types of positioning means for the slave web are contemplated by the present invention. For example, in the manufacture of laminates where one or more preformed webs are unwound from coiled rolls, an entire unwinding roll and the mandrel in which it turns may be positioned by the second servomechanism. In other situations, where the webs are newly formed and do not unwind from coiled rolls, or where an unwinding roll is at a location remote from the mating point of the webs, the positioning means for the slave web can be a cambering roll, a curved spreader roll, a contoured roll, or other means known in the art.

The invention has been described in terms of maintaining two webs in alignment. The principles involved may also be applied in alignment of three or more webs. Various alternatives are possible. One arrangement is to choose one web as the master web, and to make each of the remaining webs a slave web to the master web. Another arrangement, less simple and straightforward but still possible, is to have a first slave web which follows the master web, and a second slave web which follows the first slave web.

The invention may be used in various operations requiring registration of webs, such as laminating, printing, drying, coating, and slitting, with a wide variety of webs, films, pellicles, and foils, and is not limited to any particular process or particular type of web. Representative materials which may be processed in apparatus employing the present invention include films of regenerated cellulose, either dried or in the wet gel state; cellulose esters such as cellulose acetate; cellulose ethers such as ethyl cellulose, hydroxyethyl celllulose, and hydroxypropyl cellulose; polyvinyl acetate; polyvinyl alcohol; polyolefins such as polyethylene and polypropylene; vinyls such as polyvinyl chloride, polyvinylidene chloride and polyvinyl fluoride; polyesters such as polyethylene terephthalate; polyamides such as polyhexamethylene adipate; paper woven and nonwoven fabrics; and metal foils. The invention is especially valuable when used with thermoplastic films which are flimsy and easily stretchable, and with thin webs of gel regenerated cellulose which are easily stretched and tend to fold over and wrinkle at the edges.

In those cases where sheets are being laminated, either web may carry the adhesive, but in most cases it is more convenient to treat the adhesive-carrying web as the master web. Either web may also carry printed indicia for decoration, product identification, advertising, etc.

This invention provides a novel method of aligning webs which is of advantage in reducing to a minimum the lag time in repositioning the slave web to the master web. Another advantage is that the amount of operation required of the second servomechanism is minimized; accordingly, the second servomechanism in this method experiences far fewer excursions to the limit of its adjusting capability than it does in the prior art method. A further advantageous result is that in those situations where a cambering roll is employed to reposition the web, damage to the web in the form of stretching, wrinkling, etc., is minimized.

What is claimed is:

1. A web aligning apparatus, comprising, in combination: a common support which is movable transversely to the paths of a master web and a slave web which are to be maintained in alignment; two web edge detectors mounted on said common support, each of said detectors producing an operating signal on departure from a preselected positional relationship between itself and the web edge with which it cooperates; a first servomechanism comprising first control means and a first servomotor, said first servomotor operatively connected to said movable common support and controlled by the signal output of a first one of said edge detectors which is cooperative with an edge of the master web and which moves said common support and both of said detectors to restore the preselected positional relationship between said first detector and the edge of said master web upon generation of a signal by said first detector and to directly restore the alignment of said slave web with said master web; web positioning means for the slave web to permit transverse adjustment of the slave web; a carriage affixed to said common support which supports said web positioning means; a second servomechanism comprising second control means and a second servomotor, said second servomotor affixed to said common support, operatively connected to said web positioning means and controlled by the signal output of the second edge detector which is cooperative with an edge of said slave web and which moves said web positioning means to restore the preselected positional relationship between said second detector and the edge of said slave web upon generation of a signal by said second detector.

2. The apparatus of claim 1 wherein the web positioning means is a cambering roll.

3. The apparatus of claim 2 wherein the cambering roll is covered with a material which prevents the slave web from sliding laterally.

4. A web alignment apparatus comprising, in combination: a master web edge detector and a slave web edge detector, each of said detectors producing an operating signal on departure from a preselected positional relationship between itself and the web edge with which it cooperates; a first servomechanism comprising first control means and a first servomotor, said first servomotor controlled by the signal output of the master web edge detector; a second servomechanism comprising second control means and a second servomotor, said second servomotor controlled by the signal output of the slave web edge detector; web positioning means for the slave web to permit transverse adjustment of the slave web, said web positioning means operatively connected to said second servomotor; a carriage upon which the web positioning means is mounted; a common support which is movable transversely to the paths of a master web and slave web which are to be maintained in alignment, said support operatively connected to said first servomotor and carrying (a) said master web and slave web edge detectors, (b) said second servomotor, (c) said carriage and (d) said slave web positioning means, the preselected positional relationship between said master web detector and the edge of said master web restored and the alignment of said slave web with said master web directly restored by movement of said common support through said first servomotor upon generation of a signal by said master web detector, the preselected positional relationship between said slave web detector and the edge of said slave web restored by movement of said slave web positioning means through said second servomotor upon generation of a signal by said slave web detector.

References Cited by the Examiner

UNITED STATES PATENTS

| | | | |
|---|---|---|---|
| 2,641,416 | 6/1953 | McCleary | 242—57.1 |
| 2,735,630 | 2/1956 | Ziebolz | 242—57.1 |
| 2,827,809 | 3/1958 | Beam | 226—19 X |

M. HENSON WOOD, Jr., *Primary Examiner.*

R. A. SCHACHER, *Assistant Examiner.*